United States Patent Office 3,129,202
Patented Apr. 14, 1964

3,129,202
SYNTHETIC THERMOPLASTIC LINEAR POLYESTERS AND PROCESS
Alfred Johannes Porck, Tonawanda, N.Y., assignor to E. I. du Pont de Nemours and Company, Wilmington, Del., a corporation of Delaware
No Drawing. Filed Dec. 15, 1960, Ser. No. 75,906
12 Claims. (Cl. 260—78.4)

This invention relates to film- and fiber-forming synthetic organic polymers, and more particularly to the production of new thermoplastic linear polyesters and to films, fibers and like shaped structures formed therefrom.

An object of this invention is to provide a novel class of thermoplastic film- and fiber-forming linear polyesters. Another object is to provide a process for preparing novel thermoplastic film- and filament-forming linear polyesters. Still another object is to provide a new class of thermoplastic linear polyesters in the form of shaped structures such as self-supporting films, filaments, fibers, rods, ribbons, tubes, etc., in both the oriented (stretched) and un-oriented state. The foregoing and related objects will more clearly appear from the description which follows:

These objects are realized by the present invention which, briefly stated comprises in combination the steps of (1) reacting an intimate mixture consisting essentially of substantially stoichiometric equivalent amounts of (a) an organic diepoxide selected from the class consisting of organic diepoxides of the formula:

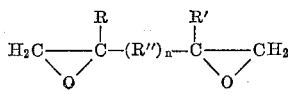

wherein R and R′ are selected from the group consisting of —H and —CH₃ radicals, R″ is a divalent saturated hydrocarbon radical of from 1 to 8 carbon atoms and having no branches larger than —CH₃, and $n$ is a cardinal number of from 0 to 1 inclusive, and (b) an organic diacid chloride of the formula:

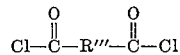

wherein R‴ is a divalent, saturated hydrocarbon radical of from 2 to 18 carbon atoms and having no branches larger than —CH₃, as reactants, and (c) a catalytic amount of a tertiary amine, as a catalyst; maintaining the reaction mixture at a temperature not above about 75° C. until polymerization has been initiated; and (2) thereafter heating said reaction mixture at a temperature of from about 90° to about 250° C. for a time sufficient to produce a film- and filament-forming polymer. The resulting polymer is a relatively high molecular weight, linear, thermoplastic poly(dichloroalkylene)-dicarboxylate capable of being formed into cold-drawable (i.e., orientable) films and filaments, and consisting essentially of recurring structural units of the general formula:

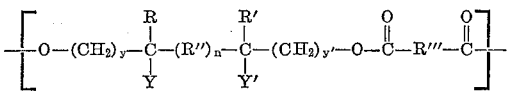

wherein R and R′ are selected from the group consisting of —H and —CH₃ radicals, R″ is a divalent, saturated hydrocarbon radical of from 1 to 8 carbon atoms and having no branches larger than —CH₃, $n$ is a cardinal number of from 0 to 1 inclusive, R‴ is a divalent, saturated hydrocarbon radical of from 2 to 18 carbon atoms and having no branches larger than —CH₃, Y and Y′ are monovalent radicals selected from the group consisting of —Cl and —CH₂Cl radicals, $y$ and $y'$ are cardinal numbers of from 0 to 1 inclusive, and when Y is —CH₂Cl, $y$ is 0 and when Y is —Cl, $y$ is 1; and when Y′ is —CH₂Cl, $y'$ is 0 and when Y′ is —Cl, $y'$ is 1.

Organic diepoxides useful for producing the relatively high molecular weight, thermoplastic linear polyesters of this invention are of the general formula:

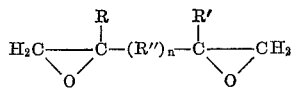

wherein R and R′ are selected from the group consisting of —H and —CH₃ radicals, R″ is a saturated divalent hydrocarbon radical of from 1 to 8 carbon atoms and having no branches larger than —CH₃, and $n$ is a cardinal number of from 0 to 1 inclusive. As representative specific diepoxides useful herein there may be mentioned butadiene diepoxide, 2-methyl butadiene diepoxide, 2,3-dimethyl butadiene diepoxide, 1,4-pentadiene diepoxide, 1,5-hexadiene diepoxide, 3,3-dimethyl-1,4-pentadiene diepoxide, and 1,11-dodecadiene diepoxide. For the production of relatively high molecular weight polymers by the process of this invention, it is essential that the organic diepoxides employed be substantially free from monoepoxide impurities, which could act to terminate polymer chains prematurely.

The coracting diacid chlorides preferably employed in carrying out the process of this invention are defined by the structural formula:

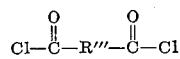

wherein R‴ is a divalent, saturated hydrocarbon radical of from 2 to 18 carbon atoms, said radical having no branches greater than —CH₃. Embraced by this structural formula are the diacid chlorides of such well-known dicarboxylic acids as succinic, adipic and sebacic acids.

The polymerization reactions with which this invention is concerned are exothermic and, once initiated, have a tendency to accelerate violently unless means are employed to moderate the reaction rate. When they are initiated by such known expedients as heating and/or by additions of HCl, control and moderation of the reaction rate is virtually impossible. The resulting violent reactions do not produce the useful, relatively high molecular weight, thermoplastic polymers desired, often yielding little but gummy, tarry residues. The catalysis of these polymerizations with tertiary amines is essential to produce the relatively high molecular weight, linear, thermoplastic polymers of the invention.

When tertiary amines, such as pyridine, are employed as catalysts in the process of this invention, it has been found that:

(1) Polymerizations may be induced at lower temperatures, thereby permitting the use of lower boiling reactants whose use might otherwise require the use of pressure equipment.
(2) The tendency for the occurrence of a violent exothermic reaction is greatly reduced, thereby making it easier to control and moderate the rate of polymerization.

Thus, tertiary amines serve not only as catalysts for the initiation of these polymerizations but also as moderators of the reaction rate.

Specific examples of tertiary amines which may be employed as the catalyst for the poly-addition polymerizations of this invention include the N,N,N-trialkylamines, e.g., triethylamine, trimethylamine, tri-n-propylamine, tributylamine, triisobutylamine, and N-methyldiethylamine; N,N,N-aryldialkylamines, e.g., N,N-dibutylaniline, N,N-diethylaniline; N,N-di-n-propylaniline and N-ethyl-N-methylaniline; N-alkylpiperidines, e.g., N-ethylpiperidine, N-methylpiperidine, N-n-propylpiperidine; N-alkylpyrroles, e.g., N-ethylpyrrole; N-alkylpyrrolidines, e.g., N-methylpyrrolidine; N,N'-dialkylpiperazines; N-alkylpyrrolines; quinoline and isoquinoline; pyrazine, pyridine and their C-alkyl-substituted derivatives. While most of these tertiary amines are liquids at room temperature and may therefore be readily mixed with the starting reactants, some are solids at room temperature, e.g., pyrazine, while trimethylamine is a gas at room temperature. While the tertiary amines which are liquids at room temperature are preferred, those that are gases at room temperature may be employed in polymerizations conducted under super-atmospheric pressures, while those tertiary amines which are solids at room temperature may be employed either at temperatures sufficiently high to render them liquid or in polymerizations wherein they may be soluble in either or both of the starting reactants.

Although the tertiary amine-catalyzed polymerizations of this invention are preferably carried out as bulk reactions between stoichiometrically equivalent amounts of organic diepoxide and dicaboxylic diacid chloride, it is permissible for the organic diepoxide to be initially present in slight (i.e., not more than about 5%) stoichiometric excess of the quantity of the diacid chloride initially present.

To minimize the possibility of cross-linking during polymerization, which event would preclude the attainment of the linear, thermoplastic polymers desired, it is essential that the starting reactants be free of ethylenic unsaturation, and it is further preferred that the tertiary amines employed as catalysts be substantially free of impurities such as primary or secondary amines. The diacid chlorides employed in the process of this invention should be substantially free of HCl, which tends to cause violent runaway reactions. For the same reason, these polymerizations are preferably carried out under anhydrous conditions, or as nearly anhydrous as may be realized economically and practically, to minimize the possibility of hydrolysis of the diacid chlorides which would release HCl.

In order to produce the relatively high molecular weight, linear thermoplastic polymers desired of this invention, it is essential that the tertiary amine-catalyzed polymerizations be carried out in two steps. The first step consists of an induction or prepolymerization, during which the reactants are maintained at temperatures not in excess of about 75° C., and during which polymerization is initiated and proceeds slowly to a moderate degree sufficient to raise the viscosity of the reaction mixture, measured at 60° C., to in the range of from about 600 to about 800 poises. This prepolymerization step is requisite in order to avoid uncontrollable polymerization which invariably will result if the starting reaction mixture is immediately heated to temperatures in excess of 90° C. Following the prepolymerization step, the reaction mass is then heated for a time at a temperature in the range of from about 90° C. to about 250° C. During the latter or finishing step, the degree of polymerization increases to produce the useful products above-described. While the tertiary amine-catalyzed polymerizations of this invention will proceed slowly at room temperature, for obvious economic reasons it is preferred to operate the prepolymerization step of the process at substantially higher temperatures, preferably within the range of from about 40° C. to about 75° C. Prepolymerizations carried out at temperatures much in excess of 75° C. are difficult to control and likely to become violently exothermic. Similarly, while the finishing step of the process may be carried out at temperatures in the range from about 90° C. to about 250° C., it is preferred for economic reasons that this step of the process be carried out at temperatures in the range of from about 100° C. to about 180° C.

It will be obvious to one skilled in the art that reaction time and temperature in both steps of the process are mutually interdependent and will be affected by many of the environmental conditions usual to polymerization processes including, among others, the specific nature of the starting reactants, the specific catalyst used and whether or not superatmospheric pressures are employed. For a given pair of reactants, catalyst system and set of process equipment, the degree to which the prepolymerization step should be carried prior to subjecting the reaction mass to the finishing step will be readily determined after a few trials. In further reproductions of such an optimized polymerization sequence, the progress of polymerization in the prepolymerizing step may be monitored by observing changes in the viscosity of the reaction mass or by periodic titration of available oxirane groups or acyl chlorine atoms.

The following specific examples will serve to further illustrate the principles and practice of this invention.

*Example 1*

48 grams (i.e., 0.2 mol) of sebacyl chloride was mixed in a reaction vessel with 17.3 grams (i.e., 0.2 mol) of butadiene diepoxide and then 6 drops of anhydrous pyridine was added to this mixture. The mixture was maintained at 70° C. for 4 hours, followed by heating for 1¾ hours at 120° C. A transparent, tough polymer resulted. This polymer was found to have an inherent viscosity of 0.52, as determined at 30° C. on a 1% solution of the polymer in a mixture consisting of 100 parts by weight of phenol in 66 parts by weight of sym-tetrachloroethane.

A quantity of this polymer was dissolved in approximately twice its volume of anhydrous chloroform and a film prepared by casting this solution on a smooth surface and evaporating the chloroform. Some physical properties of this film appear below.

| | |
|---|---|
| Tensile strength (p.s.i.) | 870 |
| Tensile modulus (p.s.i.) | 19,700 |
| Percent elongation at break | 15 |

*Example 2*

48 grams (i.e., 0.2 mol) of sebacyl chloride was mixed in a reaction vessel with 17.3 grams (i.e., 0.2 mol) of butadiene diepoxide and then six drops of anhydrous pyridine was added to the mixture. The mixture was maintained at 60° C. for 4 hours and then heated for ten hours at 120° C. The resulting polymer had an inherent viscosity of 0.59, determined as described in Example 1. A portion of this polymer was dissolved in approximately twice its volume of anhydrous chloroform, the solution filtered through glass wool and degassed by exposure of the solution to a vacuum while stirring steadily. A clear, 1.5 mil thick film was prepared by casting the solution onto a smooth surface, followed by evaporating the solvent. Some of the physical properties of this film are listed below.

| | |
|---|---|
| Tensile strength (p.s.i.) | 1,700 |
| Tensile modulus (p.s.i.) | 27,000 |
| Percent elongation at break | 580 |
| Elmendorf tear strength (g./mil) | 57 |
| Pneumatic impact strength (kg. cm./mil) | 3.8 |
| Flex life, cycles [1] | 9,000 |
| Heat-seal peel strength, g./in.[2] | 540 |
| Zero strength temperature, ° C | 110 |

[1] Du Pont pinhole flex tester.
[2] Seals made at 60° C. with a ⅛ inch wide aluminum heat seal bar; dwell time, 0.15 second; pressure, 10 p.s.i.

Samples of the above-described solvent-cast film were analyzed for chlorine content and found to contain 21.05% as against a theoretically calculated chlorine content of 21.8%. X-ray diffraction studies on this film revealed it to be crystalline.

An additional sample of this solvent-cast film was employed to surface a piece of exterior grade birch plywood by pressing the two together between two metal plates for 1 minute at 100° C. under a pressure of about 800 p.s.i. The resulting lamination was cooled in the press and on removal, the plywood had a smooth, lustrous, satiny appearance. Attempts to peel off the film were unsuccessful for the most part. What little could be removed pulled off wood fibers as it peeled.

The chloroform was evaporated from a portion of the above casting solution and a clear, 3 mil thick film was made by pressing a portion of the polymer thus isolated in a platen press for 5 minutes at 140° C. under a load of 20 tons. Several filaments were prepared from an additional portion of the polymer thus isolated by melt extrusion.

The above-described solvent-cast film and the melt-prepared filaments were cold-drawn. Molecular orientation in the cold drawn film was confirmed by the high degree of birefringence indicated when a light source was viewed through a pair of crossed, light-polarizing crystals, between which the film in question had been interposed. Alkaline hydrolysis of this polymer, which produced sebacic acid in almost quantitative yield, combined with infrared spectral analysis showed it to be a poly(dichlorobutylene) sebacate.

Other diepoxides and diacid chlorides from the classes hereinabove defined may be substituted with like effect for the specific diepoxide and diacid chloride of the preceding examples.

It is obvious from the foregoing description that the present invention provides a whole new class of synthetic, thermoplastic linear polyesters from which can be prepared useful films, filaments, fibers, tubes, ribbons and like shaped products.

I claim:

1. The process which comprises, in combination, the steps of (1) reacting an intimate mixture consisting essentially of stoichiometric equivalent amounts of (a) an organic diepoxide selected from the class consisting of organic diepoxides of the formula:

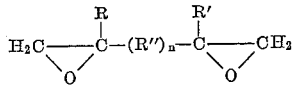

wherein R and R' are radicals selected from the group consisting of —H, and —CH$_3$, R" is a divalent saturated hydrocarbon radical of from 1 to 8 carbon atoms and having no branches larger than —CH$_3$, and n is a cardinal number of from 0 to 1 inclusive, and (b) an organic diacid chloride of the formula:

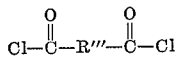

wherein R'" is a divalent saturated hydrocarbon radical of from 2 to 18 carbon atoms and having no branches larger than —CH$_3$, as reactants, and (c) a catalytic amount of a tertiary amine as catalyst; maintaining the reaction mixture at a temperature not above about 75° C. until polymerization has been initiated and the viscosity of the reaction mixture, measured at 60° C., is in the range of 600–800 poises; and (2) thereafter heating said reaction mixture at a temperature within the range of from about 90° C. to about 250° C. for a time sufficient to produce a film- and filament-forming polymer.

2. The process of claim 1 wherein the reaction mixture is initially maintained at a temperature within the range of from about 40° C. to about 75° C.

3. The process of claim 1 wherein the tertiary amine is pyridine.

4. The process of claim 1 wherein the diepoxide is butadiene epoxide, and the diacid chloride is sebacyl chloride.

5. The process of claim 4 wherein the tertiary amine is anhydrous pyridine.

6. A thermoplastic linear polymer consisting essentially of recurring structural units of the general formula:

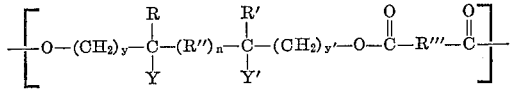

wherein R and R' are selected from the group consisting of —H and —CH$_3$ radicals, R" is a divalent, saturated hydrocarbon radical of from 1 to 8 carbon atoms and having no branches larger than —CH$_3$, n is a cardinal number of from 0 to 1 inclusive, R'" is a divalent, saturated hydrocarbon radical of from 2 to 18 carbon atoms and having no branches larger than —CH$_3$, Y and Y' are monovalent radicals selected from the group consisting of —Cl and —CH$_2$Cl radicals, y and y' are cardinal numbers of from 0 to 1 inclusive, and when Y is —CH$_2$Cl, y is 0 and when Y is —Cl, y is 1; and when Y' is —CH$_2$Cl, y' is 0 and when Y' is —Cl, y' is 1; said polymer when formed into films and filaments being capable of being cold drawn.

7. The polymer of claim 6 in the form of a film.

8. The polymer of claim 6 in the form of an oriented film.

9. The polymer of claim 6 in the form of a filament.

10. Linear thermoplastic poly(dichlorobutylene) sebacate.

11. The polymer of claim 10 in the form of a film.

12. The polymer of claim 10 in the form of an oriented film.

References Cited in the file of this patent

UNITED STATES PATENTS

| | | |
|---|---|---|
| 2,865,897 | Raecke et al. | Dec. 23, 1958 |
| 2,915,484 | Kobler et al. | Dec. 1, 1959 |
| 2,978,435 | Ernst | Apr. 4, 1961 |

FOREIGN PATENTS

| | | |
|---|---|---|
| 819,194 | Great Britain | Sept. 9, 1957 |
| 576,456 | Canada | May 26, 1959 |
| 577,565 | Canada | June 9, 1959 |